(12) United States Patent
Akaba et al.

(10) Patent No.: US 12,738,815 B2
(45) Date of Patent: Sep. 15, 2026

(54) TEMPERATURE SENSOR AND ROTARY ELECTRIC MACHINE

(71) Applicant: SHIBAURA ELECTRONICS CO., LTD., Saitama (JP)

(72) Inventors: Hiroaki Akaba, Saitama (JP); Takamasa Yoshihara, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 36 days.

(21) Appl. No.: 18/709,985

(22) PCT Filed: May 24, 2023

(86) PCT No.: PCT/JP2023/019279
§ 371 (c)(1),
(2) Date: May 14, 2024

(87) PCT Pub. No.: WO2024/009635
PCT Pub. Date: Jan. 11, 2024

(65) Prior Publication Data

US 2026/0163453 A1 Jun. 11, 2026

(30) Foreign Application Priority Data

Jul. 8, 2022 (JP) ................................ 2022-110108

(51) Int. Cl.
*H02K 11/25* (2016.01)
*G01K 1/14* (2021.01)

(52) U.S. Cl.
CPC ............... *H02K 11/25* (2016.01); *G01K 1/14* (2013.01)

(58) Field of Classification Search
CPC ................................ H02K 11/25; G01K 1/14
See application file for complete search history.

(56) References Cited

U.S. PATENT DOCUMENTS

2014/0184031 A1* 7/2014 Kaneshige ............ H02K 11/25
310/68 B
2014/0254632 A1* 9/2014 Kaneshige .............. G01K 1/14
374/208

(Continued)

FOREIGN PATENT DOCUMENTS

DE 102019124035 A1 3/2021
JP 2010-252508 A 11/2010

(Continued)

OTHER PUBLICATIONS

JP-2018125923-A Machine Translation (Year: 2018).*

(Continued)

*Primary Examiner* — Oluseye Iwarere
*Assistant Examiner* — Masoud Vaziri
(74) *Attorney, Agent, or Firm* — McDonald Hopkins LLC

(57) ABSTRACT

Positional deviation of a temperature sensor from a prescribed position of a coil due to external force such as vibration is prevented. A temperature sensor for detecting a temperature of a coil provided in a stator of a rotary electric machine, includes: a sensor element including a thermosensitive body, an electric wire electrically connected to the thermosensitive body, and a covering body made of an elastic material and covering a part of the electric wire and the thermosensitive body; and a bracket including a first holding portion configured to hold the covering body. The bracket includes a predetermined rotation axis, and the covering body is configured to be pressable against the coil by rotation operation of the bracket in a predetermined rotation direction.

11 Claims, 6 Drawing Sheets

(56) References Cited

U.S. PATENT DOCUMENTS

| | | | | |
|---|---|---|---|---|
| 2017/0370781 | A1* | 12/2017 | Yoshihara | G01K 7/22 |
| 2018/0017446 | A1* | 1/2018 | Yoshihara | H02K 11/25 |
| 2020/0393306 | A1* | 12/2020 | Yoshihara | G01K 1/14 |
| 2021/0123811 | A1 | 4/2021 | Fukuchi et al. | |
| 2024/0204623 | A1* | 6/2024 | Nitta | G01K 1/14 |

FOREIGN PATENT DOCUMENTS

| | | | | |
|---|---|---|---|---|
| JP | 2014178258 | A | * | 9/2014 |
| JP | 2018125923 | A | * | 8/2018 |
| JP | 2021-067584 | A | | 4/2021 |
| JP | 6944618 | B1 | | 10/2021 |
| WO | 2019/030110 | A1 | | 2/2019 |

OTHER PUBLICATIONS

JP-2014178258-A Machine Translation (Year: 2014).*
International Search Report for PCT/JP2023/019279 dated Jul. 11, 2023.

* cited by examiner

TEMPERATURE SENSOR AND ROTARY ELECTRIC MACHINE

CROSS-REFERENCE TO RELATED APPLICATIONS

This is the National Stage of PCT international application PCT/JP2023/019279 filed on May 24, 2023, which claims the priority of Japanese Patent Application No. 2022-110108, filed Jul. 8, 2022, both of which are incorporated herein by reference in their entirety.

TECHNICAL FIELD

The present invention relates to a temperature sensor and a rotary electric machine including the temperature sensor.

BACKGROUND ART

In a rotary electric machine such as an electric motor mounted on, for example, a vehicle, a temperature of a coil provided in a stator rises when a current flows through the coil. To avoid excessive temperature rise of the coil and stably operate the rotary electric machine, the temperature of the coil is detected using a temperature sensor, and operation of the rotary electric machine is controlled based on the detected temperature.

Patent Literature 1 proposes that, in a stator of a rotary electric machine mounted on a vehicle, a temperature sensor is inserted between coils wound around teeth adjacent to each other in a circumferential direction, to detect a temperature of the coils. The temperature sensor disclosed in Patent literature 1 is covered with an insulation resin layer, and is held by a holder made of an elastic material such as fluorine rubber. When the temperature sensor is inserted into a gap between the coils while the holder is elastically deformed, a temperature detection portion of the temperature sensor comes into contact with the coils through the resin layer.

CITATION LIST

Patent Literature

Patent Literature 1: JP 2010-252508 A

SUMMARY OF INVENTION

Technical Problem

Even in an environment where vibration is applied like a vehicle, it is desirable to prevent the temperature sensor from deviating from a prescribed position of the coil.

An object of the present invention is to provide a temperature sensor that can be prevented from deviating from a prescribed position of a coil due to external force such as vibration, and to provide a rotary electric machine including the temperature sensor.

Solution to Problem

According to the present invention, a temperature sensor for detecting a temperature of a coil provided in a stator of a rotary electric machine includes: a sensor element including a thermosensitive body, an electric wire electrically connected to the thermosensitive body, and a covering body made of an elastic material and covering a part of the electric wire and the thermosensitive body; and a bracket including a rotation axis and configured to hold the covering body in a cantilever manner.

The bracket includes a predetermined rotation axis, and the covering body is configured to be pressable against the coil by rotation operation of the bracket in a predetermined direction.

Further, according to the present invention, a temperature sensor for detecting a temperature of a coil provided in a stator of a rotary electric machine includes: a sensor element including a thermosensitive body, an electric wire electrically connected to the thermosensitive body, and a covering body made of an elastic material and covering a part of the electric wire and the thermosensitive body; and a bracket including a rotation axis and configured to hold the covering body in a cantilever manner. The covering body includes a first portion relatively short in distance from the rotation axis and held by the bracket, and a second portion relatively long in distance from the rotation axis and covering the thermosensitive body, and the second portion is outside a virtual circle passing through the first portion and having the rotation axis as a center.

A rotary electric machine according to the present invention includes: a stator including a core and a coil; a rotor configured to be rotated relative to the stator; and the above-described temperature sensor.

Advantageous Effects of Invention

With the temperature sensor of the present invention, the bracket holding the covering body can be fixed to the fixation object in a state where the covering body covering the thermosensitive body is elastically deformed and pressed against the coil. Thus, with the temperature sensor of the present invention, it is possible to prevent the sensor element from deviating from the prescribed position of the coil due to external force such as vibration and impact. As a result, the temperature of the coil can be stably and accurately detected.

BRIEF DESCRIPTION OF DRAWINGS

FIG. 3B is a plan view of the sensor element.

FIG. 4B is a plan view illustrating a second posture of the bracket after fastening.

FIG. 6B is a schematic cross-sectional view of a temperature sensor according to a second modification, and FIG. 6C is a schematic cross-sectional view of a temperature sensor according to a third modification.

DESCRIPTION OF EMBODIMENT

An embodiment of the present invention is described below with reference to accompanying drawings.

Entire Configuration

Figure 1:
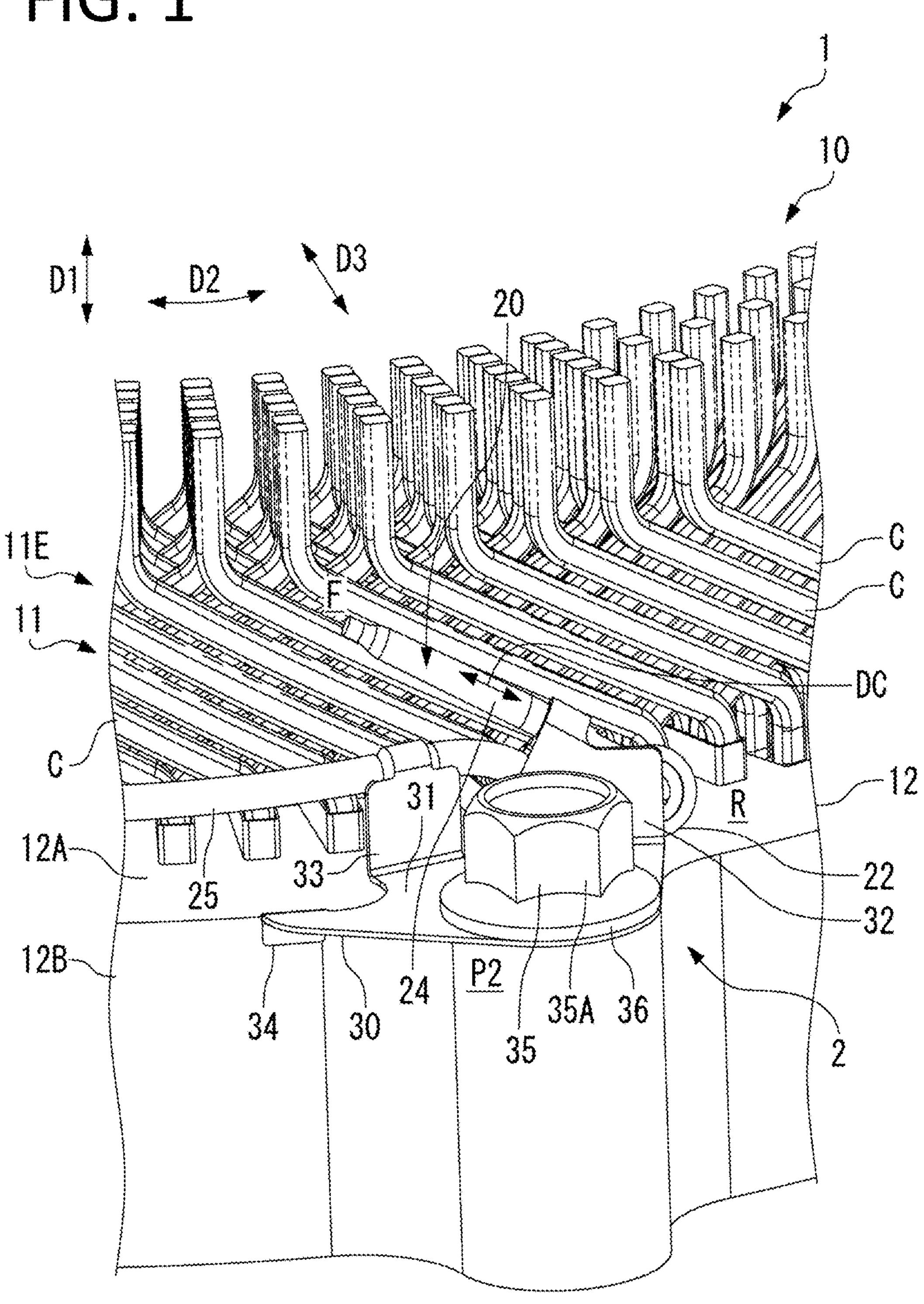
FIG. 1 is a perspective view illustrating a part of a rotary electric machine according to an embodiment of the present invention.

A temperature sensor 2 illustrated in FIG. 1 is attached to a stator 10 of a rotary electric machine 1 such as an electric motor and a generator, and detects a temperature of a coil 11 of the stator 10. The rotary electric machine 1 is mounted on a vehicle such as an electric vehicle. The rotary electric machine 1 includes the stator 10, an unillustrated rotor rotated to the stator 10, and the temperature sensor 2.

The stator 10 includes an unillustrated core (hereinafter, referred to as stator core) that is a stacked body of a plurality of electromagnetic steel sheets, a substantially cylindrical case 12 housing the stator core, and the coil 11 wound around the stator core. The coil 11 is formed of coil wires C wound in a predetermined pattern. The coil wires C protrude from a front surface 12A of the case 12 in an axial direction D1 of the stator 10 to form a coil end 11E.

In the present embodiment, a distributed winding coil is adopted as the coil 11; however, the coil 11 is not limited thereto and may be a concentrated winding coil.

Figure 2:
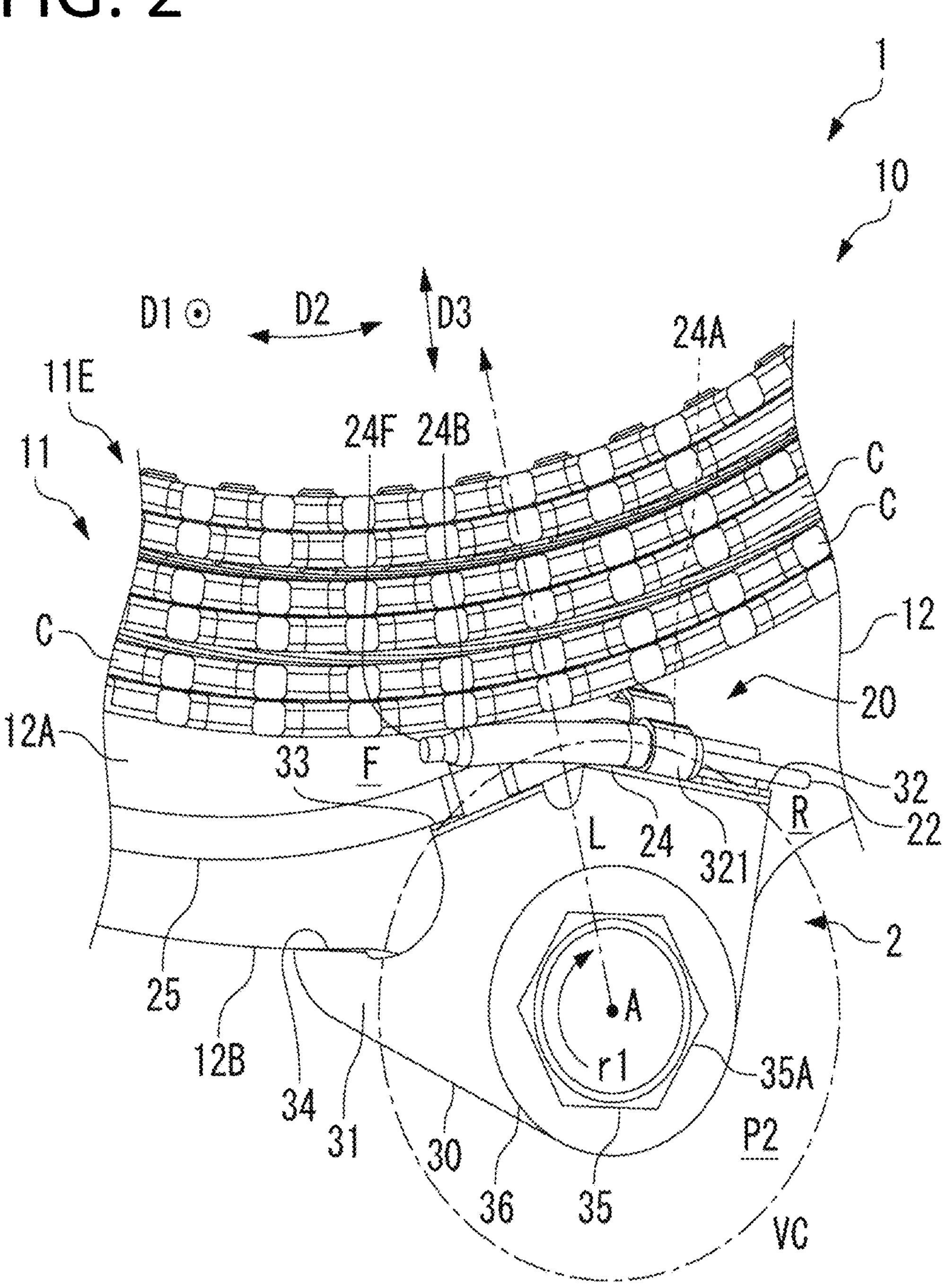
FIG. 2 is a plan view illustrating a temperature sensor and a coil as viewed from above in FIG. 1.

As illustrated in FIG. 1 and FIG. 2, the temperature sensor 2 is pressed against the coil end 11E in a substantially radial direction D3 of the coil 11, from an outer periphery to an inner periphery of the stator 10.

In FIG. 1 and FIG. 2, the axial direction Dl, a circumferential direction D2, and the radial direction D3 of the stator 10 are illustrated. The radial direction D3 represents one radial direction.

Further, with the front surface 12A of the case 12 as a reference, a side on which the coil end 11E protrudes in the axial direction D1 is referred to as an “upper side”, and a side opposite thereto is referred to as a “lower side”.

Configuration of Temperature Sensor

A configuration of the temperature sensor 2 is described with reference mainly to FIGS. 3A and 3B. The temperature sensor 2 includes a sensor element 20 detecting a temperature, and a bracket 30 holding the sensor element 20 and fixed to the case 12 as a fixation object by a bolt 35 as a male screw member. The bolt 35 corresponds to a bolt fixing the stator core to the case 12. As illustrated in FIGS. 4A and 4B, a washer 36 is disposed between a head part 35A of the bolt 35 and a fixed portion 31 as necessary.

As illustrated in FIGS. 4A and 4B, the bracket 30 includes a rotation axis (A). When the bracket 30 is rotated around the rotation axis (A) in a predetermined rotation direction r1, the temperature sensor 2 is pressed against the coil end 11E. The rotation axis (A) of the bracket 30 corresponds to a fastening center A that is an axis of the bolt 35 fastening the bracket 30 to the case 12 according to the present embodiment. Note that the illustrated rotation direction r1 corresponds to a clockwise direction.

In the present embodiment, positional relationship between the coil 11 and the temperature sensor 2 is defined such that a straight extension of a line segment L (FIG. 2) connecting the rotation axis (A) and the coil end 11E at the shortest distance passes through an unillustrated plane center of the coil end 11E or a vicinity thereof.

Sensor Element

Figure 3A:
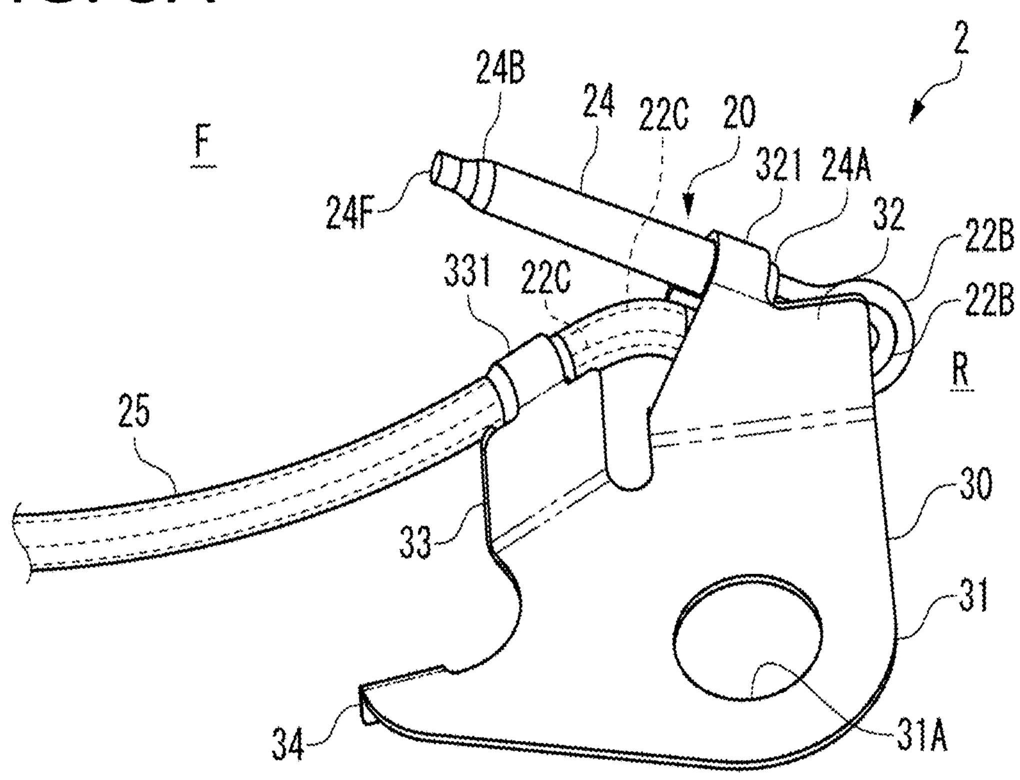
FIGS. 3A and 3B FIG. 3A is a perspective view illustrating a bracket for attaching a sensor element to the rotary electric machine as illustrated in FIG. 1.
Figure 3B:
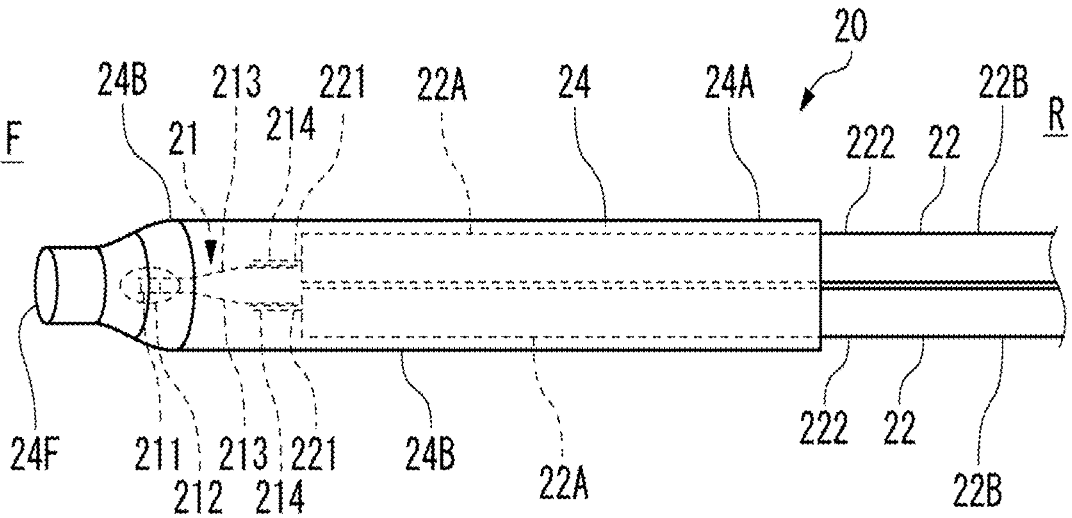
Figure 4A:
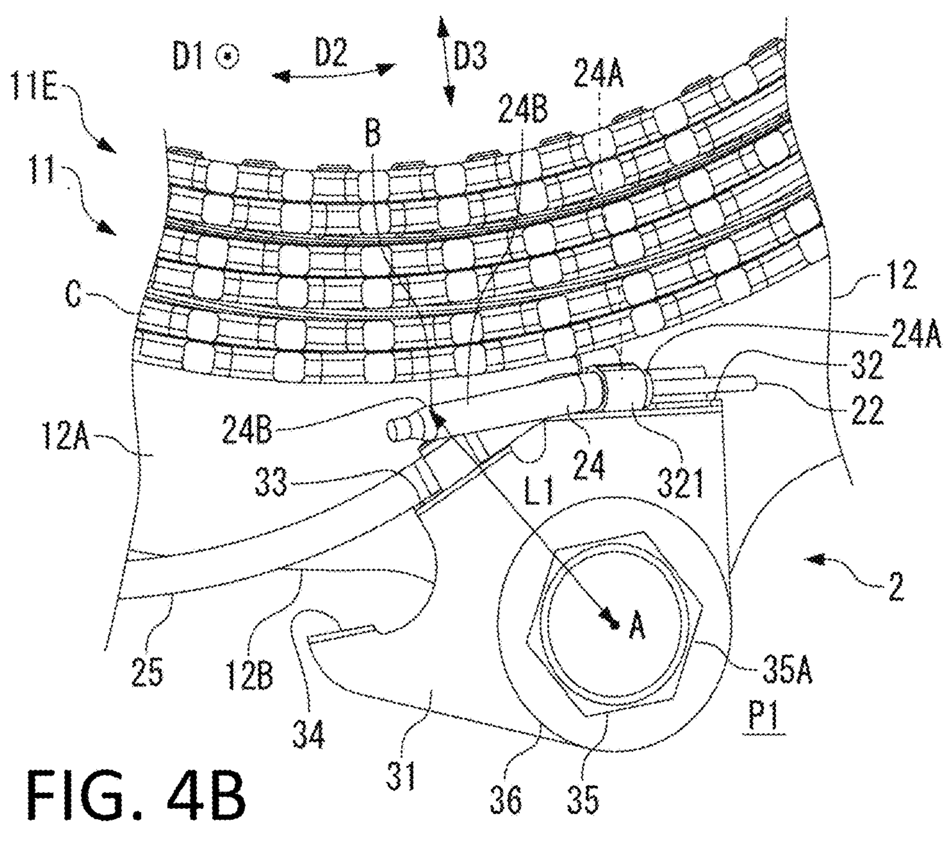
FIGS. 4A and 4B FIG. 4A is a plan view illustrating a first posture of the bracket before the bracket is fastened to a fixation object.
Figure 4B:
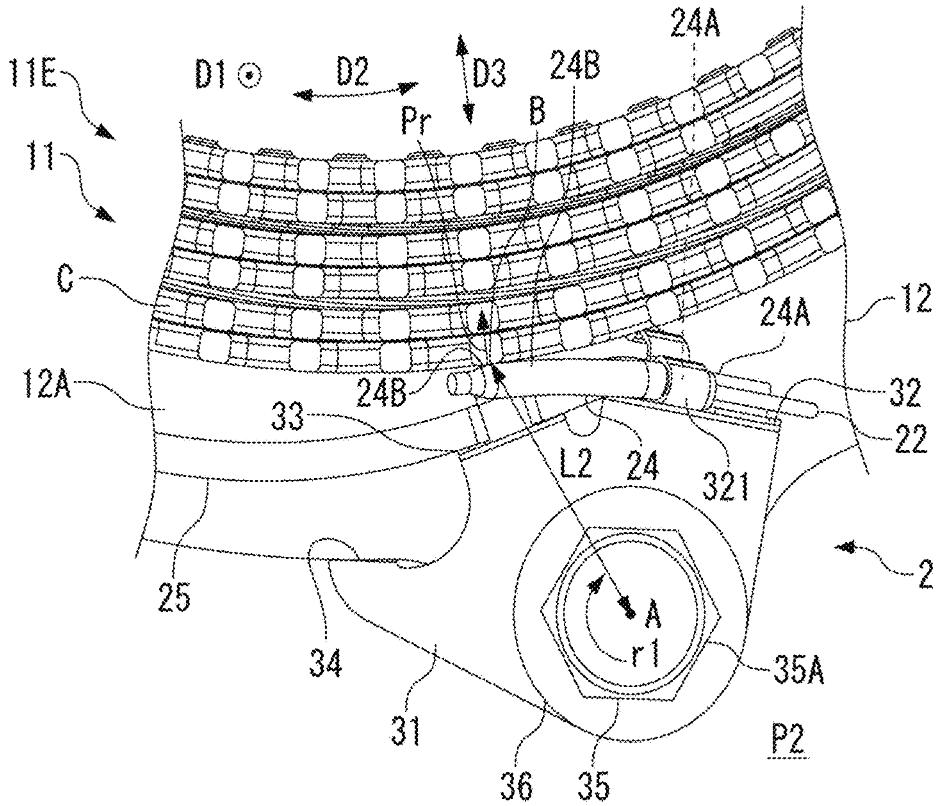

As illustrated in FIGS. 3A and 3B, the sensor element 20 includes a thermosensitive element 21, paired lead wires 22 electrically connected to the thermosensitive element 21, a covering body 24 covering the whole of the thermosensitive element 21 and parts of the lead wires 22, and a tube 25 covering predetermined sections of the paired lead wires 22 exposed from the covering body 24.

The thermosensitive element 21 includes a thermosensitive body 211, an insulation sealing body 212 covering the thermosensitive body 211, and paired clad wires 213 drawn out from the sealing body 212.

The thermosensitive body 211 is configured to be capable of detecting a temperature by using a thermistor having electric resistance that changes in response to change in temperature, or the like.

The clad wires 213 are connected to an unillustrated electrode provided on the thermosensitive body 211, and for example, Dumet wires are adopted as the clad wires 213. The paired clad wires 213 are drawn out from the sealing body 212 in the same direction. The clad wires 213 and the lead wires 22 connected to the respective clad wires 213 configure “electric wires”.

In the following, a direction in which the clad wires 213 are drawn out from the thermosensitive body 211 is referred to as “rear”, and a direction opposite thereto is referred to as “front”. In FIGS. 1 to 3B, “front” is denoted by a reference symbol F, and “rear” is denoted by a reference symbol R.

The paired lead wires 22 are connected to the respective clad wires 213, and are connected to an unillustrated temperature detection circuit. Each of the lead wires 22 includes a core wire 221 joined with the corresponding clad wire 213, and an insulation coating 222 covering the core wire 221. The paired lead wires 22 are drawn out rearward from the covering body 24, and are then folded back forward.

In other words, each of the paired lead wires 22 includes a first section 22A extending rearward inside the covering body 24, a second section 22B drawn out from the covering body 24 and folded back, and a third section 22C extending forward. When the lead wires 22 are viewed from the axial direction D1 of the stator 10, the third sections 22C extend forward from the second sections 22B in parallel with the first sections 22A below the first sections 22A by predetermined lengths. The lead wires 22 are routed in the above-described manner, and appropriate portions of the lead wires 22 are held by the bracket 30. As a result, the lead wires 22 can be routed toward the temperature detection circuit while avoiding the lead wires 22 from interfering with the coil end 11E.

The tube 25 is provided on outer peripheries of the third sections 22C. The tube 25 can bundle the paired lead wires 22 and can align directions of the paired lead wires 22.

The covering body 24 protects the thermosensitive element 21 and connection portions 214 of the thermosensitive element 21 and the lead wires 22 from external force applied from outside. A front end 24F of the covering body 24 corresponds to a front end of the sensor element 20. The thermosensitive element 21 is disposed near the front end 24F of the covering body 24.

The covering body 24 is configured to be pressable against the coil end 11E by rotation operation of the bracket 30 in the rotation direction r1.

As illustrated in FIG. 2, the covering body 24 according to the present embodiment includes a first portion 24A relatively short in distance from the rotation axis (A) (fastening center A) and a second portion 24B relatively long in distance from the rotation axis (A) (fastening center A). At the first portion 24A, the covering body 24 is held by a first holding portion 32 of the bracket 30 in a cantilever manner. The second portion 24B covers the thermosensitive body

211 as an example, and is provided on a side close to a free end. The second portion 24B is positioned outside a virtual circle VC that has a center at the rotation axis (A) and passes through the first portion 24A, in other words, the first holding portion 32. The virtual circle VC is away from the coil 11. The second portion 24B is positioned on a rear side of the first portion 24A in the rotation direction r1. The second portion 24B is pressed against the coil end 11E by rotation operation of the bracket 30 around the rotation axis (A) in the rotation direction r1. During the rotation operation, the first portion 24A held by the first holding portion 32 remains away from the coil 11, and does not come into contact with the coil 11.

The covering body 24 extends from a position on a front side of the thermosensitive element 21 to a position on the rear side of the connection portions 214. The covering body 24 is formed in a long shape long in a front-rear direction. The covering body 24 includes the first portion 24A held by the bracket 30, and the second portion 24B pressed against the coil end 11E. The second portion 24B corresponds to a region of the covering body 24 on a side close to the thermosensitive body 211. The first portion 24A corresponds to a region of the covering body 24 on a side close to the electric wires (213 and 22).

The covering body 24 according to the present embodiment has, for example, a columnar appearance. The sensor element 20 and the like are housed inside the covering body 24. A diameter of the front end 24F of the covering body 24 is less than a diameter of a portion on the rear side of the front end 24F. The appearance of the covering body 24 is not limited to a circular shape, and may be an optional shape, for example, a rectangular shape.

The covering body 24 is made of a resin material having elasticity, such as fluorine rubber and silicone rubber, in a predetermined shape. Elasticity in the present embodiment indicates that, when the bracket 30 is rotationally operated to press the second portion 24B against the coil 11, the covering body 24 is deflected with no difficulty. Examples of fluorine rubber include polytetrafluoroethylene (PTFE), and a tetrafluoroethylene-perfluoroalkylvinylether copolymer (PFA). For example, the thermosensitive element 21 and the lead wires 22 are inserted into a tube made of PTFE, and the tube is contracted by heating and is put in a mold and pressurized. This makes it possible to seal the thermosensitive element 21 and the lead wires 22 with the covering body 24.

Bracket

The bracket 30 attaches the sensor element 20 to the case 12 in a state where the second portion 24B of the covering body 24 is pressed against the coil end 11E.

The bracket 30 includes the fixed portion 31 fastened to the case 12 with the bolt 35, the first holding portion 32 holding the first portion 24A of the covering body 24 and the tube 25, a second holding portion 33 holding the tube 25 on the front side of the first holding portion 32, and a locking portion 34 locked to the case 12 in fastening. The first holding portion 32 holds the above-described first portion 24A of the covering body 24.

The bracket 30 according to the present embodiment is a plate member made of a metal. The fixed portion 31, the first holding portion 32, the second holding portion 33, and the locking portion 34 are integrally shaped by performing machining such as stamping and folding on a plate member made of a metal such as stainless steel.

Note that the bracket 30 is not limited to the plate member made of a metal, and may be made of a resin material having necessary characteristics such as strength.

The fixed portion 31 corresponds to a flat base portion including a screw hole 31A formed in a plate thickness direction. The rotation axis (A) of the bracket 30 is virtually present at a center of the screw hole 31A. The fixed portion 31 is disposed around an unillustrated hole provided in the case 12 into which a shaft part of the bolt 35 is inserted. The hole is provided from the front surface 12A of the case 12 in the axis direction D1. The shaft part of the bolt 35 reaches the stator core through the screw hole 31A of the fixed portion 31 and the hole of the case 12. When torque is applied to the head part 35A of the bolt 35 in the rotation direction r1, the bracket 30 is fastened to the case 12 by axial force of the bolt 35 in the axis direction D1.

Assuming the fastening center A (FIG. 2) that is the axis of the bolt 35 as a center of a clock face and the second holding portion 33 at a position of 12 o'clock, the locking portion 34 is substantially at a position of 10 o'clock, and the first holding portion 32 is substantially at a position of 2 o'clock.

When the bracket 30 is fixed between the bolt 35 and the case 12, and the covering body 24 is pressed against the coil end 11E, the front end 24F of the covering body 24 is positioned behind the line segment L connecting the fastening center A and the coil end 11E at the shortest distance, in the rotation direction r1 of the bracket 30. The first portion 24A and the first holding portion 32 are positioned ahead of the line segment L in the rotation direction r1.

The first holding portion 32 is bent upward relative to the fixed portion 31. A fixing piece 321 provided at an upper end of the first holding portion 32 is bent to a side approaching the coil end 11E and crimps the second portion 24B. As a result, the bracket 30 holds the covering body 24 in a cantilever manner.

When the fixed portion 31 is fixed between the bolt 35 and the case 12 by fastening of the bolt 35 and the case 12, the second portion 24B of the covering body 24 is pressed against the coil end 11E. At this time, the covering body 24 is inclined upward from the first portion 24A toward the second portion 24B, along an extending direction DC (FIG. 1) in which the coil wires C extend while being inclined to the front surface 12A of the case 12.

The first holding portion 32 according to the present embodiment also holds the lead wires 22 in addition to the covering body 24. The fixing piece 321 of the first holding portion 32 extends downward lower than the covering body 24, and crimps the tube 25 covering the third sections 22C of the paired lead wires 22.

The second holding portion 33 is bent upward relative to the fixed portion 31 as with the first holding portion 32. The second holding portion 33 is lower in height from the fixed portion 31 than the first holding portion 32. A fixing piece 331 provided at an upper end of the second holding portion 33 is bent to a side approaching the coil end 11E and crimps the tube 25.

The second holding portion 33 is positioned below the front end 24F of the covering body 24 that obliquely extends upward and forward from the first holding portion 32. Further, as illustrated in FIG. 2, the second holding portion 33 is inclined in a direction gradually separating from the coil end 11E, from the rear side to the front side in a planar view. Therefore, the tube 25 is separated from the coil end 11E with increase in distance from the second holding portion 33. The second holding portion 33 holds the tube 25 in substantially parallel with the fixed portion 31.

In contrast to the second holding portion 33, the first holding portion 32 is inclined in a direction gradually approaching the coil end 11E, from the rear side to the front side in a planar view.

The locking portion 34 is bent downward relative to the fixed portion 31 at a position separated from the fastening center A of the bracket 30. The locking portion 34 corresponds to a side surface 12B of the case 12 as a locked portion. When the bracket 30 is rotationally operated following the rotation operation of the bolt 35 to fasten the bolt 35 to the case 12, the locking portion 34 is locked to the side surface 12B of the case 12. Therefore, further rotation operation of the bracket 30 is restricted.

Note that a member to which the locking portion 34 is locked is not limited to the case 12, and may be an appropriate member on which the locking portion 34 abuts in fastening.

Attachment of Temperature Sensor by Fastening of Bolt

As described below with reference to FIGS. 4A and 4B, the bracket 30 is fixed between the bolt 35 and the case 12 with fastening of the single bolt 35 to the case 12, which makes it possible to easily and reliably attach the sensor element 20 to the case 12.

The bracket 30 and the covering body 24 held by the first holding portion 32 are configured to be rotationally operatable from a first posture P1 in which the second portion 24B is not pressed against the coil end 11E as illustrated in FIG. 4A to a second posture P2 in which the second portion 24B is pressed against the coil end 11E as illustrated in FIG. 4B.

The bracket 30 before fastening (FIG. 4A) takes the first posture P1 in which the second portion 24B is not pressed against the coil end 11E. At this time, the second portion 24B is separated from the coil end 11E as illustrated in FIG. 4A. Alternatively, the second portion 24B may come into contact with the coil end 11E as long as the rotation operation of the bracket 30 is not inhibited.

When the torque in the rotation direction r1 is applied to the bolt 35 as a right-hand screw, the bracket 30 is rotationally operated to the second posture P2 illustrated in FIG. 4B in the direction same as the rotation direction of the bolt 35, following rotation operation of the bolt 35 by friction between the fixed portion 31 and the bolt 35, and then fastening is completed. When the bracket 30 is rotationally operated from the first posture P1 to the second posture P2 around the fastening center A as described above, the covering body 24 held by the first holding portion 32 is also rotationally operated in the direction same as the rotation direction of the bracket 30. In the illustrated example, the covering body 24 gradually approaches the coil end 11E from the rear side to the front side from the state where the covering body 24 extends substantially along a circumferential direction D2 or a tangent on an outer periphery of the coil 11 (FIG. 4A), and the second portion 24B is pressed against the coil end 11E from side. A direction of pressing force Pr of the covering body 24 acting on the coil end 11E from the outside to the inside in the radial direction D3 is illustrated by an arrow.

At this time, the second portion 24B of the covering body 24 is pressed against the coil end 11E along the coil wires C. When the second portion 24B is pressed against the coil end 11E, a distance L2 from the fastening center A to a pressed position B of the second portion 24B against the coil end 11E becomes less than a distance L1 during the rotation operation.

The elastic force of the covering body 24 contributes to the pressing force Pr, and the second portion 24B comes into contact with the coil end 11E at pressure enough to maintain the second portion 24B at a prescribed position under a condition that vibration or impact is applied. In other words, the covering body 24 forms a pressing mechanism pressing the sensor element 20 against the coil end 11E in cooperation with the bracket 30 that is rotationally operated following rotation of the bolt 35.

In parallel with such rotation operation of the bolt 35, the bracket 30, and the covering body 24, the bolt 35 also operates in the axial direction D1 to generate axial force. When the locking portion 34 abuts on the side surface 12B of the case 12, the rotation operation of the bracket 30 is regulated. Therefore, it is possible to rotate only the bolt 35 and to firmly fasten the bracket 30 to the case 12 while avoiding an excessive load from acting on the thermosensitive element 21 covered with the covering body 24.

Effects of Present Embodiment

Main effects by the temperature sensor 2 according to the present embodiment are described.

With the temperature sensor 2, the bracket 30 holding the covering body 24 can be fixed to the case 12 as the fixation object in a state where the covering body 24 covering the thermosensitive body 211 is elastically deformed and pressed against the coil 11. Thus, with the temperature sensor 2, it is possible to prevent the sensor element 20 from being deviated from the prescribed position of the coil end 11E due to external force such as vibration and impact, and to maintain the state where the second portion 24B is pressed against the prescribed position of the coil end 11E at the prescribed pressure. As a result, the temperature of the coil 11 can be stably and accurately detected through temperature detection by the thermosensitive element 21 positioned at the second portion 24B.

With the temperature sensor 2, the sensor element 20 can be pressed against the coil end 11E by using the elastic force of the covering body 24 covering the thermosensitive body 211 and the like. Thus, with the temperature sensor 2, it is unnecessary to provide another elastic member to obtain the elastic force. This makes it possible to reduce the components and to simplify the structure.

The bracket 30 is fixed by fastening of the case 12 and the bolt 35 that has the specification same as the specification of the bolt for fixing the stator core to the case 12. Therefore, in a process of a work for assembling the stator core to the case 12, the temperature sensor 2 can be assembled to the stator 10. As a result, work efficiency of assembly is improved, and the number of components can be reduced to suppress the cost.

The covering body 24 held by the first holding portion 32 of the bracket 30 is disposed along the extending direction DC of the coil wires C, namely, to be inclined to the axial direction D1. As a result, as compared with a case where the covering body 24 is disposed along the axial direction D1 or along a direction orthogonal to the axial direction D1, the second portion 24B can be brought into tight contact with the coil wires C with a large contact area. This makes it possible to widely secure a heat transfer area from the coil 11 to the sensor element 20, and to contribute to improvement in detection accuracy.

The bracket 30 is reliably fixed between the bolt 35 and the case 12, and the sensor element 20 and the bracket 30 are fixed at two positions of the first holding portion 32 and the second holding portion 33. Therefore, the sensor element 20 is more stably held by the bracket 30 against external force such as vibration and impact. This makes it possible to contribute to stabilization and accuracy improvement of the temperature detection.

Since the first holding portion 32 stands upward from the fixed portion 31, the covering body 24 held at the upper end of the first holding portion 32 is separated from the front surface 12A of the case 12, and a space of a predetermined volume is secured between the case 12 and the covering body 24. As a result, heat transfer between the stator 10 and the sensor element 20 can be suppressed, and influence of the stator 10 on the temperature detection of the coil 11 can be suppressed. Note that the stator 10 is greater in heat capacity than the coil 11, and is lower in temperature than the coil 11 during operation of the rotary electric machine.

When the locking portion 34 is locked to the case 12, excessive rotation operation of the bracket 30 beyond the second posture P2 is restricted. As a result, it is possible to firmly fasten the bracket 30 to the case 12 while avoiding damage of the thermosensitive body 211 and the like caused by an excessive load.

Modifications

Other than the above description, the configurations described in the above-described embodiment can be selected or appropriately changed to the other configurations without departing from the spirit of the present invention.

Figure 5:
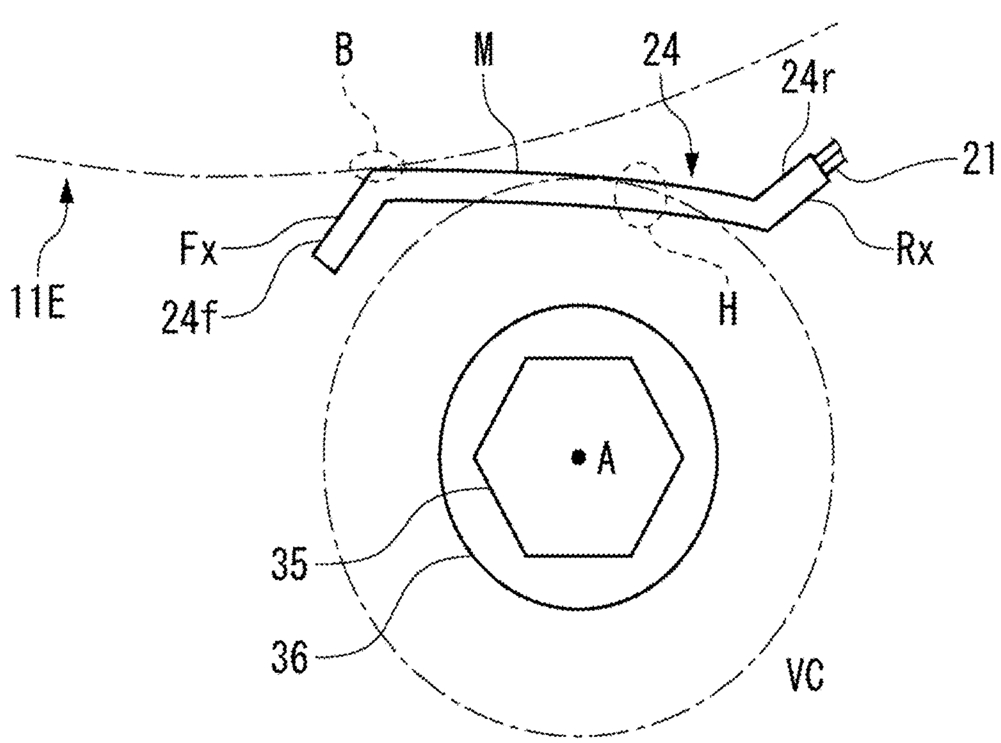
FIG. 5 is a schematic plan view of a temperature sensor according to a first modification.

The covering body 24 is not limited to the example in which the front end portion is pressed against the coil end 11E, and the pressed position B of the covering body 24 pressed against the coil end 11E may be positioned on the rear side of a front end portion 24*f* as in an example illustrated in FIG. 5. A front extension region Fx is extended forward relative to the covering body 24 in the above-described embodiment.

Further, the covering body 24 is not limited to the example in which the rear end portion is held by the bracket 30, and a held position H held by the first holding portion 32 (FIG. 2) of the bracket 30 may be positioned on the front side of a rear end portion 24*r* as in the example illustrated in FIG. 5. A rear extension region Rx is extended rearward relative to the covering body 24 in the above-described embodiment. Note that the position of the covering body 24 held by the bracket 30 is not limited to the position H illustrated in FIG. 5, and the held position H may be present in the rear extension region Rx.

Both of the front extension region Fx and the rear extension region Rx do not interfere with the coil end 11E in the process of rotation operation of the bracket 30. Note that the rear extension region Rx may be bent to a side separating from the coil end 11E relative to a middle region M.

Figure 6A:
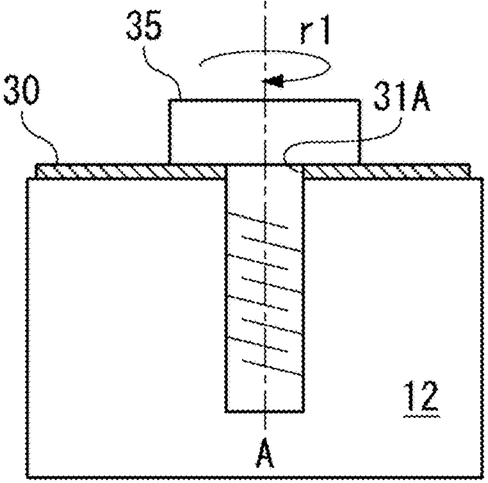
FIGS. 6A to 6C FIG. 6A is a schematic cross-sectional view of the temperature sensor according to the embodiment.
Figure 6B:
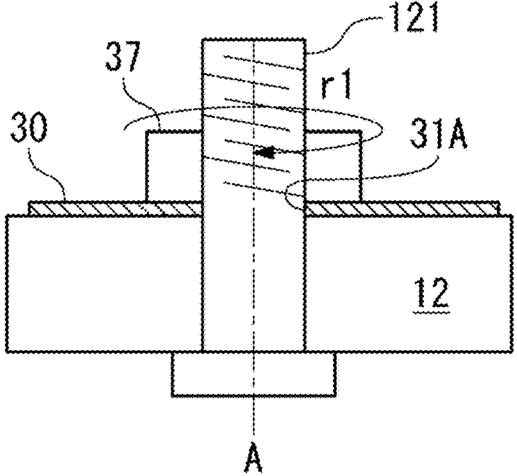
Figure 6C:
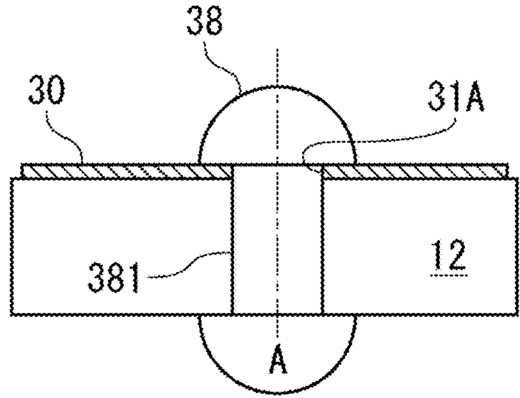

To fix the temperature sensor according to the present invention to the fixation object such as the case 12 of the stator 10, a nut 37 as a female screw member may be used as illustrated in FIG. 6B, or a rivet 38 may be used as illustrated in FIG. 6C, in addition to using the bolt 35 as illustrated in FIG. 6A.

The nut 37 is fastened with a male screw 121 inserted into the screw hole of the case 12. When the torque in the rotation direction r1 is applied to the nut 37, the bracket 30 is also rotated around the rotation center (A) following rotation of the nut 37 by friction between the nut 37 and the bracket 30, and the covering body 24 is accordingly pressed against the coil end 11E.

In a case of using the rivet 38, the rotation center (A) is also present in the screw hole 31A of the bracket 30 into which a shaft part 381 is inserted. Therefore, before fastening, the bracket 30 can be rotated to press the covering body 24 against the coil end 11E. In the state where the covering body 24 is pressed against the coil end 11E, a load in an axial direction is preferably applied to the rivet 38 to fasten the rivet 38.

Although not illustrated, the bracket 30 may be fixed to the case 12 by supplying a resin material in a flowing state, a melted metal material, or the like into the internal spaces of the screw hole 31A of the bracket 30 and the hole of the case 12 and solidifying the supplied material. Also in this case, the bracket 30 is fixed to the case 12 in the state where the bracket 30 is rotated around the rotation axis A to press the covering body 24 against the coil end 11E.

The sensor element 20 according to the above-described embodiment is fixed to the bracket 30 by crimping the first portion 24A of the covering body 24 with the fixing piece 321 of the first holding portion 32; however, the sensor element 20 may be fixed to the bracket 30 by an appropriate method other than crimping. The first portion 24A can be held by the first holding portion 32 of the bracket 30 by using, for example, a bolt or a rivet. Alternatively, the first portion 24A can be fixed to the first holding portion 32 of the bracket 30 by a method of insert molding in which the bracket 30 is disposed in a mold for molding the covering body 24.

The lead wires 22 are not necessarily folded back forward behind the covering body 24. The lead wires 22 can be routed in an appropriate direction with an appropriate route while avoiding interference with the coil 11 and other members. Depending on a diameter of the coil end 11E, an attachment angle of the temperature sensor 2 to the coil end 11E, and the like, the paired lead wires 22 drawn out from the covering body 24 may extend rearward in one direction, behind the covering body 24.

The second holding portion 33 holding the lead wires 22 can be provided at an appropriate position of the bracket 30 as necessary. For example, the second holding portion 33 may be disposed ahead of the first holding portion 32 in the rotation direction r1.

It is assumed that an upper limit of fastening force (torque) of a tool fastening the bolt 35 (or nut 37) is set. In such a case, even when the locking portion 34 is not provided on the bracket 30, the bracket 30 can be reliably fixed by the axial force of the bolt 35 (or nut 37), and the bracket 30 can be made stationary at the second posture P2 without applying an excessive load to the thermosensitive element 21, at completion of fastening.

Note that the male screw member used to fasten the bracket 30 is not limited to the bolt, and may be other member including a male screw, for example, a screw.

The object to which the fixed portion 31 of the bracket 30 is fixed is not limited to the case 12, and may be another member of the stator 10, or a member disposed around the stator 10.

The example in which the second portion 24B covers the thermosensitive body 211 is described; however, the present invention is not limited thereto. In other words, the temperature can be detected as long as the thermosensitive body 211 is provided near the second portion 24B pressed against the coil 11.

Supplements

The following configurations can be grasped from the above-described disclosure.

[1] A temperature sensor for detecting a temperature of a coil provided in a stator of a rotary electric machine, the temperature sensor including:
a sensor element including a thermosensitive body, an electric wire electrically connected to the thermosensitive body, and a covering body made of a resin material having elasticity and covering a part of the electric wire and the thermosensitive body; and
a bracket including a rotation axis and configured to hold the covering body in a cantilever manner, in which
the bracket includes a predetermined rotation axis, and
the covering body is configured to be pressable against the coil by rotation operation of the bracket in a predetermined rotation direction.

[2] The temperature sensor according to item [1], in which
the covering body includes a first portion relatively short in distance from the rotation axis and held by the bracket, and a second portion relatively long in distance from the rotation axis and covering the thermosensitive body, and
the second portion is outside a virtual circle passing through the first portion and having the rotation axis as a center.

[3] The temperature sensor according to item [2], in which the second portion is positioned on a rear side of the first portion in the rotation direction.

[4] The temperature sensor according to item [3], in which when the covering body is pressed against the coil,
the second portion is positioned behind a line segment connecting the rotation axis and the coil at a shortest distance in the rotation direction, and
the first portion is positioned ahead of the line segment in the rotation direction.

[5] The temperature sensor according to any one of items to [4], in which
the bracket is fixed to a fixation object by fastening of a screw member and the fixation object, and
the covering body is configured to be pressable against the coil by rotation operation of the bracket with rotation for the fastening of the screw member to the fixation object.

[6] The temperature sensor according to item [5], in which the bracket is fixed, together with a core of the stator, to a case of the stator as the fixation object, by the screw member fastening the core to the case.

[7] The temperature sensor according to any one of items to [6], in which the bracket includes a locking portion locked to a locked portion to restrict excess rotation operation.

[8] The temperature sensor according to any one of items to [7], in which the covering body is disposed along an extending direction in which wires of the coil extend.

[9] The temperature sensor according to any one of items [1] to [8], in which the bracket includes a first holding portion configured to hold the covering body, and a second holding portion configured to hold the electric wire on a front side of the first holding portion in a direction of the rotation operation.

[10] The temperature sensor according to any one of items to [9], in which the bracket includes a base portion including a screw hole into which the screw member is inserted, a holding portion bent relative to the base portion and configured to hold the covering body, and the locking portion formed by being bent in a direction opposite to the holding portion relative to the base portion.

[11] A temperature sensor for detecting a temperature of a coil provided in a stator of a rotary electric machine, the temperature sensor including:
a sensor element including a thermosensitive body, an electric wire electrically connected to the thermosensitive body, and a covering body made of an elastic material and covering a part of the electric wire and the thermosensitive body; and
a bracket including a rotation axis and configured to hold the covering body in a cantilever manner, in which
the covering body includes a first portion relatively short in distance from the rotation axis and held by the bracket, and a second portion relatively long in distance from the rotation axis and covering the thermosensitive body, and
the second portion is outside a virtual circle passing through the first portion and having the rotation axis as a center.

[12] A rotary electric machine, including:
a stator including a core and a coil;
a rotor configured to be rotated relative to the stator; and
the temperature sensor according to any one of items to [11], configured to detect a temperature of the coil.

REFERENCE SIGNS LIST

1 Rotary electric machine
2 Temperature sensor
10 Stator
11 Coil
11E Coil end
12 Case (fixation object, locked portion)
12A Front surface
12B Side surface
20 Sensor element
21 Thermosensitive element
22 Lead wire
22A First section
22B Second section
22C Third section
24 Covering body
24A First portion
24B Second portion
24F Front end
25 Tube
30 Bracket
31 Fixed portion (base portion)
31A Screw hole
32 First holding portion
33 Second holding portion
34 Locking portion
35 Bolt (screw member)
35A Head part
36 Washer
37 Nut (screw member)
38 Rivet
121 Male screw
211 Thermosensitive body
212 Sealing body
213 Clad wire
214 Connection portion

221 Core wire
222 Insulation coating
321 Fixing piece
331 Fixing piece
381 Shaft part
A Fastening center (rotation axis)
B Pressed position
C Coil wire
D1 Axial direction
D2 Circumferential direction
D3 Radial direction
DC Extending direction
F Front
Fx Front extension region
H Held position
M Middle region
R Rear
Rx Rear extension region
Pr Pressing force
L Line segment
L1, L2 Distance
P1 First posture
P2 Second posture
r1 Rotation direction
VC Virtual circle

The invention claimed is:

1. A temperature sensor for detecting a temperature of a coil provided in a stator of a rotary electric machine, the temperature sensor comprising:

a sensor element including a thermosensitive body, an electric wire electrically connected to the thermosensitive body, and a covering body made of a resin material having elasticity and covering a part of the electric wire and the thermosensitive body; and a bracket including a rotation axis and configured to hold the covering body in a cantilever manner, wherein the bracket includes a predetermined rotation axis, and the covering body is configured to be pressable against the coil by rotation operation of the bracket in a predetermined direction, wherein the covering body includes a first portion relatively short in distance from the rotation axis and held by the bracket, and a second portion relatively long in distance from the rotation axis and covering the thermosensitive body, and the second portion is outside a virtual circle passing through the first portion and having the rotation axis as a center.

2. The temperature sensor according to claim 1, wherein the second portion is positioned on a rear side of the first portion in a direction of the rotation operation.

3. The temperature sensor according to claim 2, wherein when the covering body is pressed against the coil, the second portion is positioned behind a line segment connecting the rotation axis and the coil at a shortest distance in the direction of the rotation operation, and the first portion is positioned ahead of the line segment in the direction of the rotation operation.

4. The temperature sensor according to claim 1, wherein the covering body is disposed along an extending direction in which wires of the coil extend.

5. The temperature sensor according to claim 1, wherein the bracket includes a first holding portion configured to hold the covering body, and a second holding portion configured to hold the electric wire on a front side of the first holding portion in a direction of the rotation operation.

6. A rotary electric machine, comprising:

a stator including a core and a coil;

a rotor configured to be rotated relative to the stator; and the temperature sensor according to claim 1, configured to detect a temperature of the coil.

7. A temperature sensor for detecting a temperature of a coil provided in a stator of a rotary electric machine, the temperature sensor comprising:

a sensor element including a thermosensitive body, an electric wire electrically connected to the thermosensitive body, and a covering body made of a resin material having elasticity and covering a part of the electric wire and the thermosensitive body; and a bracket including a rotation axis and configured to hold the covering body in a cantilever manner, wherein the bracket includes a predetermined rotation axis, and the covering body is configured to be pressable against the coil by rotation operation of the bracket in a predetermined direction, wherein the bracket is fixed to a fixation object by fastening of a screw member and the fixation object, and the covering body is configured to be pressable against the coil by rotation operation of the bracket with rotation for the fastening of the screw member to the fixation object.

8. The temperature sensor according to claim 7, wherein the bracket is fixed, together with a core of the stator, to a case of the stator as the fixation object, by the screw member fastening the core to the case.

9. The temperature sensor according to claim 7, wherein the bracket includes a locking portion locked to a locked portion to restrict excess rotation operation.

10. The temperature sensor according to claim 9, wherein the bracket includes a base portion including a screw hole into which the screw member is inserted, a holding portion bent relative to the base portion and configured to hold the covering body, and the locking portion formed by being bent in a direction opposite to the holding portion relative to the base portion.

11. A temperature sensor for detecting a temperature of a coil provided in a stator of a rotary electric machine, the temperature sensor comprising:

a sensor element including a thermosensitive body, an electric wire electrically connected to the thermosensitive body, and a covering body made of a resin material having elasticity and covering a part of the electric wire and the thermosensitive body; and a bracket including a rotation axis and configured to hold the covering body in a cantilever manner, wherein the covering body includes a first portion relatively short in distance from the rotation axis and held by the bracket, and a second portion relatively long in distance from the rotation axis and covering the thermosensitive body, and the second portion is outside a virtual circle passing through the first portion and having the rotation axis as a center.

* * * * *